July 28, 1953         J. A. CORTELLI         2,647,231
AUTOMATIC STARTER FOR INDUCTION MOTORS
Filed May 25, 1950
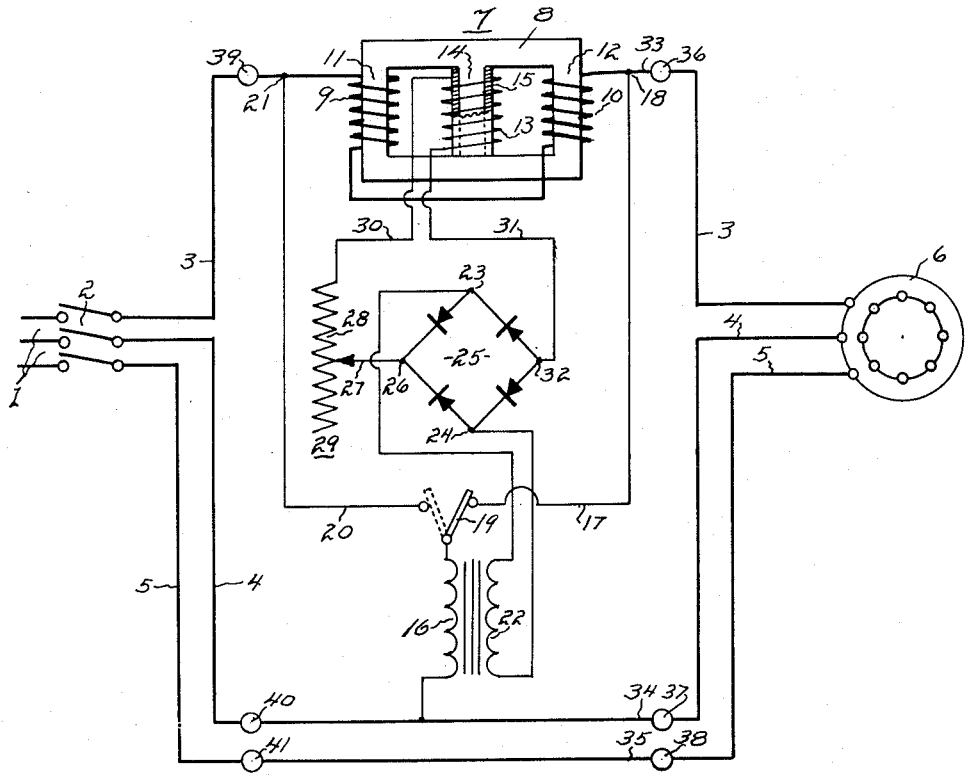
INVENTOR.
John A. Cortelli
BY Harry P. Canfield
ATTORNEY Patented July 28, 1953

2,647,231

UNITED STATES PATENT OFFICE 2,647,231

AUTOMATIC STARTER FOR INDUCTION MOTORS

John A. Cortelli, Cleveland Heights, Ohio, assignor to The Clark Controller Company, Cleveland, Ohio, a corporation of Ohio Application May 25, 1950, Serial No. 164,160

6 Claims. (Cl. 318—229)

This invention relates to starters or accelerators for electric motors; and is particularly applicable to motors of the general class that are supplied with three phase alternating current; illustrative of which are squirrel cage induction motors.

It is known that a three phase induction motor may be started from rest and accelerated up to full speed by means of a single phase rheostat.

Rheostat resistance is provided in only one of the three supply lines to the motor and the resistance is gradually cut out as acceleration proceeds.

The rheostat comprises moving parts and an operating mechanism.

The principal object of the present invention is to provide a starter or accelerator of this class which will control the current in one motor line to accelerate the motor; but which will be inherently automatic in operation and have no moving mechanical parts.

To this end, the invention comprises a saturable reactor in one motor line. When the three motor lines are first connected to the alternating current power supply lines, a direct current saturating winding of the reactor is thereby initially energized by rectified current supplied by a transformer; the potential impressed on the transformer primary is initially of reduced value and gradually rises due to its being connected to the said motor line, and the build up of the rectified current is thereby retarded; the rate at which the current in the saturable winding builds up is further retarded by an adjustably set rheostat; and is still further retarded by its own inherent inductance; the building up of direct current flux in the reactor by the saturating winding is retarded by the reaction of a short circuited loop.

Several retarding or delaying actions are thus provided for, dependent in effectiveness one upon another, and all acting concurrently, to retard the rate at which inductance of the saturable reactor in the said line to the motor is reduced, as the motor accelerates, thus providing timed or retarded acceleration by means inherent in the apparatus and connections.

The invention is fully disclosed in the following description taken in connection with the accompanying single figure of drawing, which is a diagrammatic representation of a motor and the accelerating apparatus and connections.

Referring to the drawing, there is shown at 1 three alternating current power supply lines; at 2 a line switch; and at 3—4—5 three motor lines going to a motor 6, which is to be started or accelerated according to the invention.

At 7 is a saturable reactor, having a conventional three leg core 8. Reactor windings 9 and 10, in the motor line 3 are on the outer legs 11 and 12 in series with the motor line 3; and a highly inductive direct current winding 13 is on the middle leg 14.

Closely surrounding the middle leg 14 and within the winding 13 is a sleeve 15 of copper or like low resistance metal.

The direct current winding 13 is energized as follows. A transformer primary 16 is connected at one side to the motor line 4 and at the other side is connected by a wire 17 to the motor line 3, at a point 18, between the motor 6 and the reactor windings 9 and 10.

A double throw switch 19 is provided in the line of the wire 17, and may be thrown to the dotted line position and then will connect the primary 16 to the motor line 3 at a point 21 on the other side of the reactor windings 9—10 for a purpose to be described.

The secondary 22 of the transformer is connected to input points 23—24 of a tetragon rectifier loop 25, the output point 26 of the rectifier supplying direct current by a wire 27 through the resistor 28 of a manually adjustable rheostat 29 thence by wire 30 to the winding 13, from the winding by a wire 31 to the rectifier point 32.

In operation, upon closing the line switch 1, three phase current goes to the motor 6 by motor lines 3—4—5. The motor is assumed to be connected to a driven load. The current in the line 3 is caused to be smaller than that in the lines 4 and 5 by the well known action of the reactor windings 9—10, and the motor therefore starts with reduced torque. The direct current winding 13 begins to receive rectified current and produces flux in the middle leg 14 and in a well known manner this flux reduces the inductance to the reactor and the current in the line 3 begins to increase.

When the current in winding 13 and the flux in the middle leg of the reactor have ultimately reached full maximum values, the said effect of the reactor will have become negligible and substantially full torque will be developed in the motor 6. But in the meantime, the increase of flux in the middle leg from zero to its ultimate value is retarded, and the development of motor torque to full value is delayed and the motor and its load are thereby accelerated to full speed gradually. This retardation is effected by several actions occurring concurrently as follows.

Direct current to the winding 13 is rectified from transformer alternating secondary current, and the transformer primary is connected to the point 18 between the reactor and the motor so that the primary is not initially energized at full voltage but at a reduced and gradually rising voltage as the potential drop in the reactor diminishes. This causes the rise of current in the winding 13 and rise of flux in the middle leg 14 to be retarded.

The rise of current in the winding 13 (and therefore the rise of flux in the middle leg) is retarded by the inductance of the winding 13 itself.

The increase of flux in the middle leg 14 of the reactor core lags behind the increase of current in the winding 13 producing the flux, because of the choking action of the sleeve 15 on the core.

The rate of increase of current in the winding 13 and rise of flux in the middle leg is further retarded by the resistor 28, which determines the maximum value to which the current will rise. That is to say, the current will increase more rapidly if it approaches an ultimate high value than if it approaches a low value.

The rheostat 29 adjustably varies the ultimate value and therefore provides a convenient means to adjustably vary the rate of acceleration.

It will be observed that these above described retarding actions do not act separately, but that the total retarding action is not merely the sum thereof. For example, the sleeve 15 would prescribe a fixed rate of flux increase, if the current in the winding 13 instantly came up to a maximum value; but since the rise of current in the winding 13 is retarded, the action of the sleeve is modified thereby; also the increase of current in the winding 13 would occur at a fixed rate if it were subjected initially to a fixed constant voltage, but the change of voltage on it due to deriving energy from the motor main 3 modifies its rate of increase; also the effect of the inductance of the winding 13 itself to retard the rise of current in it, is modified by the modified voltage producing the current; and each of the retarding actions is modified by the setting of the rheostat 29.

In some cases, the rise of current in the winding 13 may occur slowly enough without utilizing the connection point 18, with the consequent very slow rate of potential increase on the winding; and in such cases the transformer primary 16 may be connected to the point 21 at the power side of the reactor windings 9—10, whereby the rate of increase of potential will be higher.

The apparatus above described may be assembled as a unit having three starter mains 33—34—35 therein, with terminals 36—37—38 at one end for connection to the motor, and terminals 39—40—41 at the other end for connection to the power supply.

As to practical quantitative data for a motor starter of this type, it has been found that for a 2¼ horsepower motor, a reactor may be used having normally an impedance of 200 ohms, at the start of acceleration, and at the end an impedance of 20 ohms or less. A transformer having an output voltage of 24 volts may be used with a selenium dry plate rectifier. A 50 ohm rheostat will give suitable adjustment; and acceleration times of the order of one second may be attained.

I claim:

1. In a starter for a polyphase induction motor, a plurality of starter mains having end terminals for connecting them respectively at one end to corresponding motor mains and at the other end to corresponding alternating current supply mains; a saturable reactor comprising a multi-part core; a reactor winding on one part of the core in series with one starter main; a direct current saturating winding on another part of the core; a transformer having its primary connected to two of the starter mains at the supply side of the reactor winding; and having a potential step down secondary; a dry plate rectifier having input and output terminals, the input terminals connected to the transformer secondary; an adjustable resistor; the resistor and saturating winding connected in series with the rectifier output terminals; a closed conductor coaxial with the direct current winding and on the same core part therewith, and of sufficiently low resistance to retard the rise of flux in the core part produced by the direct current winding thereon.

2. In a starter for a polyphase induction motor, a plurality of starter mains having end terminals for connecting them respectively at one end to corresponding motor mains and at the other end to corresponding alternating current supply mains; a saturable reactor comprising multi-part core; a reactor winding on one part of the core in series with one starter main; a direct current saturating winding on another part of the core; a transformer having its primary connected to two of the starter mains, one connection being at the motor side of the reactor winding and having a potential step down secondary; a dry plate rectifier having input and output terminals, the input terminals connected to the transformer secondary; an adjustable resistor; the resistor and saturating winding connected in series with the rectifier output terminals; a closed conductor coaxial with the direct current winding and on the same core part therewith, and of sufficiently low resistance to retard the rise of flux in the core part produced by the direct current winding thereon.

3. In a starter for a polyphase induction motor, a plurality of starter mains having end terminals for connecting them respectively at one end to corresponding motor mains and at the other end to corresponding alternating current supply mains; a saturable reactor comprising a multi-part core; a reactor winding on one part of the core in series with one starter main; a direct current saturating winding on another part of the core; a transformer having its primary connected to two of the starter mains and having a potential step down secondary; a dry plate rectifier having input and output terminals, the input terminals connected to the transformer secondary; an adjustable resistor; the resistor and saturating winding connected in series with the rectifier output terminals; a closed conductor coaxial with the direct current winding and on the same core part therewith, and of sufficiently low resistance to retard the rise of flux in the core part produced by the direct current winding thereon.

4. Means for starting, and timing the acceleration of a polyphase motor having polyphase energizing lines, when the lines are connected to polyphase supply mains, comprising: a saturable reactor having a multi-part core; a reactor winding on one part of the core in the line of one supply main to the motor, and a direct current saturating winding on another part of the core; a transformer having its primary connected to two of the lines, at the supply side of the reactor winding, and having a step-down potential secondary; a dry plate rectifier having input and output terminals, the input terminals connected to the transformer secondary; an adjustable resistor; the resistor and saturating winding connected in series with the rectifier output terminals; a closed conductor coaxial with the direct current winding and on the same core part therewith, and of sufficiently low resistance to retard the rise of flux in the core part produced by the direct current winding.

5. Means for starting, and timing the acceleration of a polyphase motor having polyphase energizing lines, when the lines are connected to polyphase supply mains, comprising: a saturable reactor having a multi-part core; a reactor winding on one part of the core in the line of one supply main to the motor, and a direct current saturating winding on another part of the core; a transformer having its primary connected to two of the lines, one connection being at the motor side of the reactor winding, and having a step-down potential secondary; a dry plate rectifier having input and output terminals, the input terminals connected to the transformer secondary; an adjustable resistor; the resistor and saturating winding connected in series with the rectifier output terminals; a closed conductor coaxial with the direct current winding and on the same core part therewith, and of sufficiently low resistance to retard the rise of flux in the core part produced by the direct current winding.

6. Means for starting, and timing the acceleration of a polyphase motor having polyphase energizing lines, when the lines are connected to polyphase supply mains, comprising: a saturable reactor having a multi-part core; a reactor winding on one part of the core in the line of one supply main to the motor, and a direct current saturating winding on another part of the core; a transformer having its primary connected to two of the lines, and having a step-down potential secondary; a dry plate rectifier having input and output terminals, the input terminals connected to the transformer secondary; an adjustable resistor; the resistor and saturating winding connected in series with the rectifier output terminals; a closed conductor coaxial with the direct current winding and on the same core part therewith, and of sufficiently low resistance to retard the rise of flux in the core part produced by the direct current winding.

JOHN A. CORTELLI.

References Cited in the file of this patent

UNITED STATES PATENTS

| Number | Name | Date |
|---|---|---|
| 1,905,720 | Jones | Apr. 25, 1933 |
| 1,979,890 | Lee | Nov. 6, 1934 |
| 2,247,073 | Thompson | June 24, 1941 |
| 2,363,881 | Lord | Nov. 28, 1944 |
| 2,386,580 | Wickerham | Oct. 9, 1945 |
| 2,408,461 | Wickerham | Oct. 1, 1946 |
| 2,511,219 | Porgorzelski | June 13, 1950 |
| 2,552,203 | Morgan | May 8, 1951 |